April 15, 1958  A. W. NOON  2,830,682
TWO-SHOE BRAKE OPERATING LINKAGE
Filed May 3, 1955
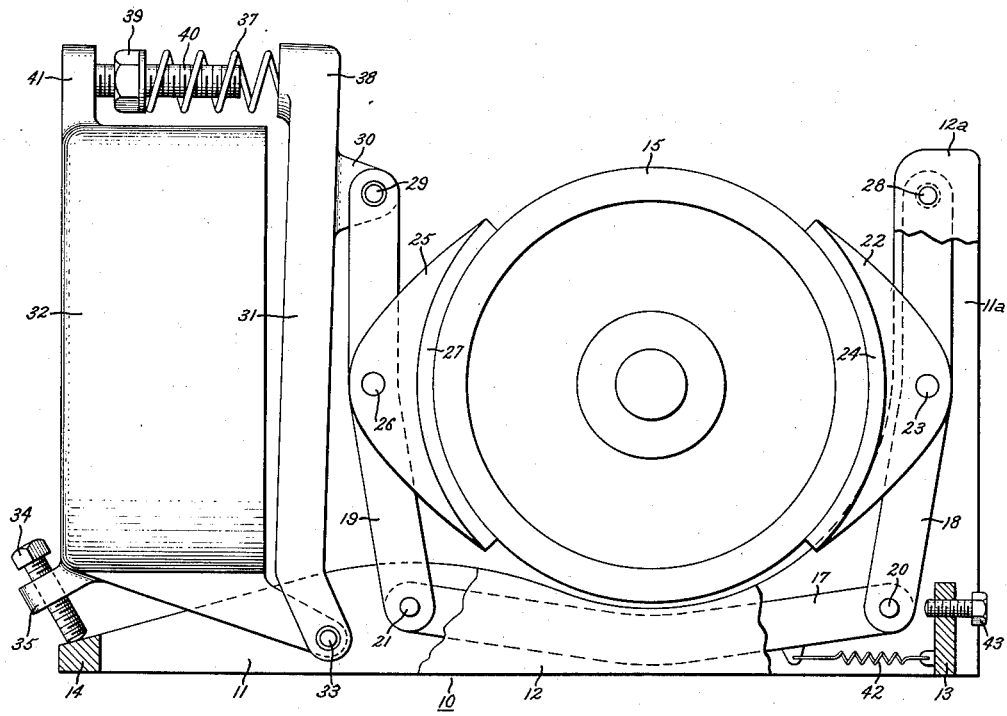
Inventor:
Alonzo W. Noon,
by Raymond A. Miles
His Attorney.

2,830,682

TWO-SHOE BRAKE OPERATING LINKAGE

Alonzo W. Noon, Los Altos, Calif., assignor to General Electric Company, a corporation of New York Application May 3, 1955, Serial No. 505,585

9 Claims. (Cl. 188—171)

My invention relates to brakes, particularly two-shoe electromagnetic brakes having an operating linkage for enabling both shoes to be jointly spring applied to the brake drum and electromagnetically released.

Such electromagnetic brakes are widely used in various industrial applications for repeatedly slowing down, stopping and holding static electric motor-driven equipment as, for example, in steel mill drives, cranes, hoists, movable bridges, conveyors, and in marine or other similar service.

In such heavy industrial service the brake shoe linings and also the brake drum are necessarily subjected to severe or even excessive wear. Consequently, it is generally required that these parts be readily accessible for easy and quick replacement in order to minimize any periods of costly "down time." Likewise, for such industrial service it is generally desirable that the principal moving parts of the two-shoe operating linkage be nested for protection within a sturdy mounting frame or base for the operating electromagnet in such a way as to straddle the brake drum and also distribute the strong spring force applying the two shoes so as to minimize the linkage bearing pressures and resulting wear as well as reduce the over-all weight, size and costs of the brake.

Of even more importance from the standpoint of satisfactory service maintenance, the two-shoe brake operating linkage should enable quick and easy adjustment to be made to compensate for the progressive wear of the shoe linings and other parts before the resulting variation in air gap of the operating electromagnet becomes excessive.

Hence, it is a general object of the present invention to provide a new and improved double straddling form of two-shoe brake operating linkage that will not only meet the general requirements noted above but also provide one simple maintenance adjustment to compensate for any wear of either or both shoe linings, the brake drum and also the bearings of all linkage parts.

It is a further object of the invention to provide a new and improved open side form of two-shoe brake operating linkage to facilitate the removal of the brake shoes or their linings and also the brake drum through the open side of the linkage mechanism.

It is a still further object of the invention to provide a new and improved two-shoe brake operating linkage whereby only half of the force applied to each shoe need be transmitted through each bearing of the torque yoke linkage supporting the shoes.

My invention will be more fully understood and its various objects and advantages further appreciated by referring to the following detailed specification, taken in conjunction with the accompanying drawing in which the single figure is a side elevation, partly in section, of an electromagnetic brake operating mechanism, embodying the improvements of the present invention.

Referring now to the drawing, the two-shoe electromagnetic brake construction shown by way of illustration comprises a base 10 formed of spaced-apart metal plates 11 and 12 that are joined together by the cross spacers 13 and 14, preferably welded between the ends of the plates. For the sake of clarity in the drawing, practically all of the nearer side plate 12 has been broken away in order more clearly to reveal the details of the brake operating linkage that is nested in protective cooperating relation between the spaced-apart plates 11 and 12. As shown, the base plate 11 is provided with a projecting upright arm portion 11a extending at right angles thereto. Plate 12 is of duplicate construction. This enables the arms 11a and 12a to serve as an auxiliary mounting base so as to permit the mounting of the electromagnetic brake directly thereon in case it should be desired to conserve floor space.

The inside edges of the base plates 11 and 12 preferably are curved as shown to permit horizontal axial movement of the brake drum 15 into and out of its normal operating position in the space between the two base plates 11 and 12.

The improved two-shoe brake operating linkage of the present invention includes a tension member 17 that extends subjacent the brake drum 15 so as to nest in the space between the base plates 11 and 12. This tension member 17 has the torque yokes 18 and 19 pivotally connected at the opposite ends thereof by means of the pivot pins 20 and 21 and projecting upwardly therefrom so as to straddle only one side of the brake drum 15 and provide an open space on the opposite side for the radial removal of the drum. The brake shoe 22 is mounted on the torque yoke 18 intermediate its ends by means of the pivot pin 23 so that the brake lining 24 carried by shoe 22 will frictionally engage one side of the brake drum 15. The opposite brake shoe 25 is mounted on the torque yoke 19 intermediate its ends by means of the pivot pin 26 so that the lining 27 carried by shoe 25 will frictionally engage with the opposite side of the brake drum 15.

The upper end of the torque yoke 18 is pivotally supported on the pin 28 fixed between the upper ends of the spaced-apart upright arms 11a and 12a extending from the fixed supporting base 10 so as to nest yoke 18 therebetween.

The upper end of the torque yoke 19 is pivotally supported by means of the movable pin 29 carried by the clevis lugs 30 formed on the movable armature 31 of the operating electromagnet 32. In the form shown both the armature 31 and the operating electromagnet 32 itself are pivotally mounted on the pin 33 that extends between the spaced-apart plates 11 and 12 forming the base 10. Thus the angular position of the operating electromagnet 32 relative to the base 10 can be easily and quickly varied by means of the adjusting screw 34 that is threaded into the lug 35 extending from the magnet so as to engage the end of the screw 34 with the cross support 14 of the base 10.

A variable force for applying the brake shoes 22 and 25 is supplied by the compression spring 37. This spring has one end seated in a socket 38 formed at the upper end of the pivoted armature 31. The other end of spring 37 engages the nut 39 threaded on the stud 40 carried by the lug 41 extending from the upper side of the pivoted operating electromagnet 32. Thus adjustment of the nut 39 enables the degree of compression of spring 37 to be varied with a corresponding variation in the retarding torque produced by the brake.

In operation whenever the magnetizing winding (not shown) of the operating electromagnet 32 is deenergized, the force of compression spring 37 is released to rotate the armature 31 away from the operating electromagnet 32 and thereby carry the movable pin 29 and the upper end of the torque yoke 19 to the right or in a clockwise direction, and thereby engage brake shoe 25 with the brake drum 15. Thereupon the torque yoke 19 pivots clockwise on the brake shoe pivot pin 26 to produce tension in the member 17. This necessarily causes endwise movement of the tension member 17 below and tangentially to the drum 15 to move the lower end of torque yoke 18 to the left or in a clockwise direction about its fixed supporting pivot pin 28 so as to engage the brake shoe 22 with the opposite side of the brake drum 15. In this way the drum 15 is clamped between the shoes 22 and 25 upon relative movement of the operating elements 31 and 11a produced by spring 37. The resulting torque reaction of the torque yoke 18 is transmitted by pin 28 and the upright fixed torque resisting arms 11a and 12a to the base 10, while the torque reaction on the torque yoke 19 is transmitted through pin 29 and the armature 31 and pivot pin 33 to the base 10 that is fixedly mounted adjacent one side of the drum 15.

Such torque resisting action of the two-shoe brake operating linkage just described is due to the fact that the fixed upright arms 11a and 12a of the base plate and the relatively movable pivoted armature 31 project in spaced-apart relation from the base 10 so as to straddle the same side of the brake drum 15 as the torque yoke arms 18 and 19 that project from the ends of the tension member 17 to be suspended by the pins 28 and 29 in double straddling relation with the same side of the brake drum 15 and thus cooperate in jointly providing the open space on the opposite side for the radial removal of the drum.

When the magnetizing winding (not shown) of operating electromagnet 32 is energized, the armature 31 is attracted to compress spring 37 and move the upper end of torque yoke 19 to the left and thereby carry brake shoe 25 out of engagement with the brake drum 15. This immediately relieves the tension in member 17 so that the light biasing spring 42 can move the tension member 17 endwise to the right tangentially to the brake drum 15 and thereby rotate the lower end of torque yoke 18 to the right or in a counterclockwise direction about its fixed pivotal mounting pin 28 and thereby carry the brake shoe 22 out of engagement with the brake drum 15. The adjustable stop screw 43 carried by the frame cross brace 13 limits such releasing movement of the brake shoe 22.

When both brake shoes 22 and 25 are released in the manner just described, or preferably by mechanically compressing and suitably locking spring 37, the brake drum 15 can then be lifted bodily upwardly, if desired, for inspection, repair, or replacement service. Both brake shoes 22 and 25 can rotate on their pivotal mounting on the torque yokes to permit such free upward removal of the brake drum 15 from the open side of the improved two-shoe brake operating linkage. In this way the double straddling on the same side of the brake drum 15 of the fixed upright arms 11a and 12a and the relatively movable upright armature 31 projecting from the base 10 and of the torque yokes 18 and 19 projecting upwardly from the ends of the tension member 17 enables quick and easy removal of the brake drum 15, and also the brake shoes 22 and 25, from the open side of the brake mechanism. Such improved nested double straddling construction also enables the over-all size and weight of the brake mechanism to be reduced.

As either or both of the brake shoe linings 24 or 27 wear, as will inevitably occur in heavy duty industrial service, the air gap between armature 31 and the operating electromagnet 32 will progressively increase. But with the improved operating linkage it is a relatively simple matter to adjust the screw 34 so as to return the air gap of the operating electromagnet 32 to the normal or desired value. Thus one simple adjustment serves to compensate for the wear of the linings of either or both brake shoes as well as for wear of the brake drum 15 or wear of all of the pivot bearings 20, 21, 28, 29 and 33 involved in the operating linkage. However, the improved brake operating linkage will considerably reduce the wear on these pivotal bearings. This is due to the fact that each bearing need carry only half of the total force applied by the compression spring 37 to each brake shoe, since the brake shoes are mounted centrally on the torque yokes. Hence the linkage bearing parts can be made lighter and of less cost.

While I have described by way of illustration a preferred embodiment of my invention, modifications will occur to those skilled in the art and I, therefore, wish to have it understood that I intend in the appended claims to cover all such changes and modifications as fall within the true spirit and scope of my invention.

What I claim as new and desire to secure by Letters Patent of the United States, is:

1. A brake comprising a rotatable drum, a tension member movable adjacent one side of the drum and having relatively movable torque yokes projecting therefrom to straddle the drum, and each yoke having a brake shoe carried between the ends thereof to frictionally engage the drum, and operating means including a support disposed adjacent the one side of the drum and having projecting spaced-apart relatively movable torque resisting elements straddling the same side of the drum as the yokes to provide an open space on the opposite side for the radial removal of the drum and each element provided with a connection with the projecting end of a corresponding torque yoke to clamp the drum between the shoes upon relative movement of said elements.

2. A brake comprising a rotatable drum, a tension member movable adjacent one side of the drum and having relatively movable torque yokes projecting therefrom to straddle the drum and each yoke having a brake shoe carried between the ends thereof to frictionally engage the drum, operating means including a support disposed adjacent the one side of the drum and having projecting spaced-apart relatively movable torque resisting elements straddling the same side of the drum as the yokes to provide an open space on the opposite side for the radial removal of the drum and each element provided with a connection with the projecting end of a corresponding torque yoke to clamp the drum between the shoes upon relative movement of said elements in one direction, and means including a spring and an electromagnet mounted on the support and interconnected for effecting relative movement of said elements in opposite directions.

3. A brake comprising a rotatable drum, a tension member movable endwise adjacent one side of the drum and having relatively movable torque yokes projecting from opposite ends thereof to straddle the drum and each yoke having a brake shoe pivotally mounted between the ends thereof to frictionally engage the drum, and operating mechanism having a base extending adjacent said one side of the drum and having a fixed arm and a spaced-apart movable arm projecting from the base to straddle the same side of the drum as the torque yokes to provide an open space on the opposite side for the radial removal of the drum and each element provided with a connection with the projecting end of a corresponding yoke to clamp the drum between the shoes upon movement of said movable arm.

4. An open side brake mechanism comprising a rotatable drum, a tension member movable endwise adjacent one side of the drum and having relatively movable torque yokes pivotally connected thereto and projecting therefrom to straddle the drum and each yoke having a brake shoe pivotally mounted between its ends thereon to frictionally engage the drum, and operating mechanism including a support mounted adjacent said one side of the drum and provided with spaced-apart relatively movable torque resisting elements projecting therefrom to straddle the same side of the drum as the yokes to provide an open space on the opposite side for the radial removal of the drum and each element provided with a connection with the projecting end of a corresponding yoke to clamp the drum between the shoes upon relative movement of said elements in one direction and enable lateral removal of the drum from the open side of the brake mechanism upon relative movement of said elements in the opposite direction.

5. A brake comprising a rotatable drum, a tension member movable tangentially adjacent one side of the drum and having relatively movable torque yokes pivotally connected thereto and projecting therefrom to straddle the drum and each yoke having a brake shoe pivotally mounted between its ends thereon to frictionally engage the drum, a support mounted adjacent said one side of the drum and provided with spaced-apart relatively movable torque resisting elements projecting therefrom to straddle the same side of the drum as the yokes to provide an open space on the opposite side for the radial removal of the drum and each element provided with a connection with the projecting end of a corresponding yoke to clamp the drum between the shoes upon relative movement of said elements, and an electromagnet having an armature pivoted on the support to form one of said torque resisting elements.

6. A brake comprising a rotatable drum, a tension member movable tangentially adjacent one side of the drum and having relatively movable torque yokes pivotally connected thereto and projecting therefrom to straddle the drum and each yoke having a brake shoe pivotally mounted between its ends thereon to frictionally engage the drum, a support mounted adjacent said one side of the drum and provided with spaced-apart relatively movable torque resisting elements projecting therefrom to straddle the same side of the drum as the yokes to provide an open space on the opposite side for the radial removal of the drum and each element provided with a connection with the projecting end of a corresponding yoke to clamp the drum between the shoes upon relative movement of said elements, and an electromagnet pivotally mounted on the support and having a concentrically pivotally mounted armature forming one of said torque resisting elements.

7. A brake comprising a drum normally rotatable on a horizontal axis, a pair of upright yokes spaced apart on opposite sides of the drum and each having a brake shoe pivotally mounted between its ends thereon for frictionally engaging the drum, a tension element interconnected between the lower ends of the yokes, and operating mechanism having a base extending subjacent the drum and provided with spaced-apart relatively movable elements projecting upwardly therefrom on opposite sides of the drum and each provided with a pivotal connection with the upper end of a corresponding yoke for suspending the yokes to clamp the drum between the shoes upon relative movement of said elements in one direction and permit upward removal of the drum upon opposite relative movement of said elements.

8. A brake comprising a rotatable drum having a horizontal axis, a tension member extending subjacent the drum and having relatively movable upright torque yokes pivotally connected thereto to straddle the drum and each yoke having a brake shoe pivotally mounted between its ends thereon to frictionally engage the drum, and operating mechanism having spaced-apart base plates extending subjacent the drum to nest the tension member therebetween and provided with spaced-apart relatively movable torque resisting elements projecting upwardly therefrom to straddle the same side of the drum as the yokes and each having a pivotal connection with the upper end of a corresponding torque yoke for suspending the torque yokes and tension member to clamp the drum between the shoes upon relative movement of said elements in one direction.

9. A brake comprising a rotatable drum having a horizontal axis, a tension member extending subjacent the drum and having relatively movable upright torque yokes pivotally connected thereto to straddle the drum and each yoke having a brake shoe pivotally mounted between its ends thereon to frictionally engage the drum, a spring biasing said tension member for limited movement tangentially to the drum in one direction to release a corresponding one of the brake shoes, and operating mechanism having a base extending subjacent the drum and provided with spaced-apart relatively movable torque resisting elements projecting upwardly therefrom to straddle the same side of the drum as the yokes and each having a pivotal connection with the upper end of a corresponding torque yoke for suspending the torque yokes and tension member to clamp the drum between the shoes upon relative movement of said elements in one direction, said operating means including a compression spring for effecting the relative movement of said elements in said one direction and power means for effecting the relative movement of said elements in the opposite direction.

References Cited in the file of this patent
UNITED STATES PATENTS

| | | |
|---|---|---|
| 1,672,314 | Hall | June 5, 1928 |
| 2,436,880 | Burgett | Mar. 2, 1948 |